(No Model.)

J. SCHELLHORN.
MOLDING POTTERY.

No. 499,148. Patented June 6, 1893.

Witnesses:
J. B. McGirr.
M. J. McMahon.

Inventor:
John Schellhorn,
by his Attorney
J. R. Littell

UNITED STATES PATENT OFFICE.

JOHN SCHELLHORN, OF FAIRPORT, IOWA.

MOLDING POTTERY.

SPECIFICATION forming part of Letters Patent No. 499,148, dated June 6, 1893.

Application filed June 28, 1892. Serial No. 438,334. (No model.)

*To all whom it may concern:*

Be it known that I, JOHN SCHELLHORN, a citizen of the United States, residing at Fairport, in the county of Muscatine and State of Iowa, have invented certain new and useful Improvements in Molding Pottery; and I do hereby declare that the following is a full, clear, and exact description of the invention, which will enable others skilled in the art to which it appertains to make and use the same.

This invention relates to devices for molding pottery, such as flower pots, and the method of forming the molding models.

The object of the invention is to provide a simple and improved model in which the flower-pots may be quickly and uniformly molded and at the same time produce the usual aperture in the bottom of the pots.

Figure 1:
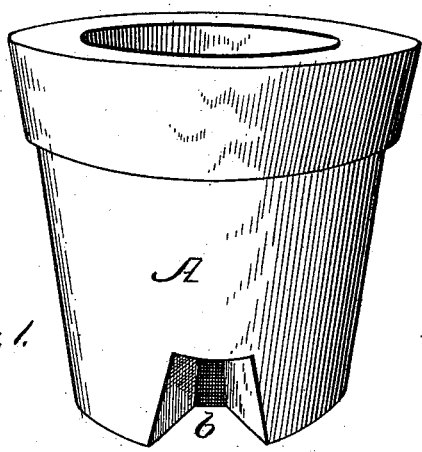
Figure 2:
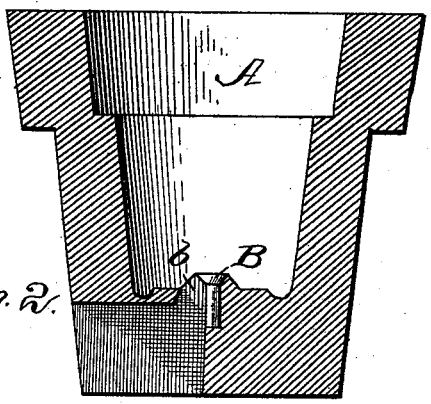
Figure 3:
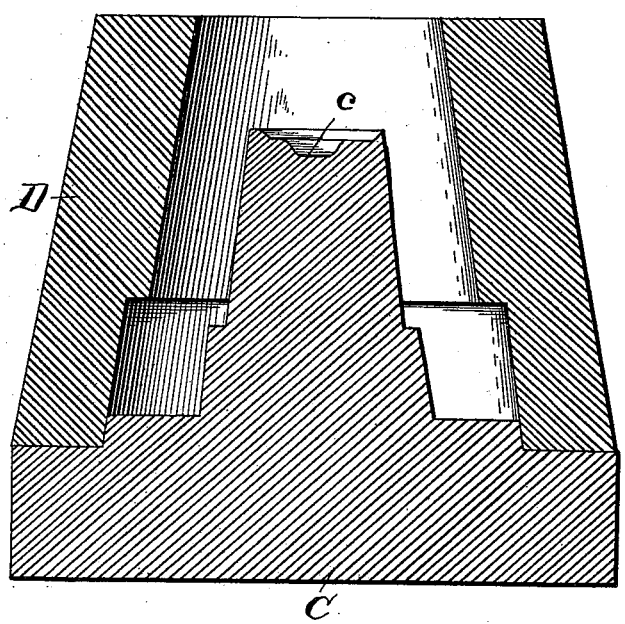
Figure 4:
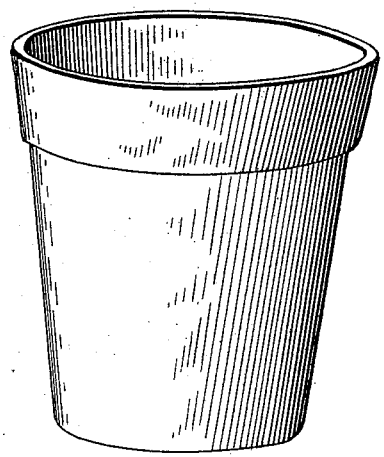

In the drawings—Figure 1 is a perspective view of a molding model embodying my invention. Fig. 2 is a longitudinal sectional view thereof. Fig. 3 is a similar view of the two molds used for forming the model. Fig. 4 is a detail perspective view of one of the completed flower pots.

Corresponding parts in the figures are denoted by the same letters of reference.

Referring to the drawings, A designates the model within which the flower pots are molded, and which is preferably formed of plaster of paris. With a view to forming the aperture in the base of the flower pot simultaneously with the molding of the latter, the model A is provided in its closed end with an inwardly-projecting stud, B, constructed of metal, burnt clay, rubber, wood or other suitable material and in the shape of a headed bolt. The model A is further provided adjacent to the stud B with an aperture, $b$, which serves as an air vent during the operation of molding the flower-pots, said aperture extending transversely from the stud to the exterior of the model.

In practice, the molding model is itself first molded between two molds, C and D. The former of these, the base mold, has an exterior surface conforming to the desired interior surface of the model. This mold is also provided in its upper end with a central recess or depression, $c$, flaring toward its open end. The mold D has an interior surface conforming to the desired exterior of the model. The interior diameter of the mold D is greater than the exterior diameter of the mold C, thus leaving an annular space within which the model is formed.

The method of forming the model is as follows: The head of the stud B is inserted within the recess $c$, and the mold D adjusted over the mold C, when the plaster of paris in a plastic state is poured between the molds. In this manner, the stem of the stud B is securely embedded in the model with its head projecting within the interior of the same.

The models when in constant use being worn away and rendered useless, the molds above described constitute a simple means of quickly and cheaply forming new models.

The operation and advantages of my improved model will be readily understood by those skilled in the art to which it appertains. The model being in position upon a molder's revolving table a quantity of clay is placed therein. The operator then with the ordinary molder's handle bears down upon the clay, which owing to the rapid rotary motion of the model is forced upward against the sides of the model, and at an even thickness over the bottom and sides of the model. In its downward movement, the handle contacts with the stud B, removing the clay therefrom and thus forming the aperture in the pot during the operation of molding the latter.

I claim as my invention—

As an improvement in devices for molding flower pots, a molding model formed in a single piece and provided interiorly with an upwardly projecting headed stud, B, embedded in the base of said model, and with an air-vent, $b$, the latter extending downwardly adjacent said stud and terminating in a transverse outwardly-flaring opening; substantially as set forth.

In testimony whereof I affix my signature in presence of two witnesses.

JOHN SCHELLHORN.

Witnesses:
ED. MCKINNEY,
N. ROSENBERGER.